2,765,316

METHOD FOR PREPARING DESOXYCHOLIC ACID

Robert H. Sifferd, Joliet, Ill., assignor to Armour and Company, Chicago, Ill., a corporation of Illinois No Drawing. Application September 25, 1953,
Serial No. 382,464

5 Claims. (Cl. 260—397.1)

This invention relates to a method of precipitating 3,12-dihydroxy-7-ketocholanic acid and an addition compound thereof. The method and addition compound of this invention have particular utility in separating the 7-keto derivative (3,12-dihydroxy-7-ketocholanic acid) from other keto derivatives of cholic acid.

Desoxycholic acid is important as a starting material for the synthesis of cortisone. The principal source of this acid is bile, which also contains cholic acid and other bile acids. Usually, bile contains about three times as much cholic as desoxycholic acid, which makes it desirable to convert at least part of the cholic acid into desoxycholic acid to increase the yield of the latter material. This conversion is now being carried out on a commercial basis by various oxidation-reduction procedures.

The usual practice in converting cholic to desoxycholic acid is to first separate the desoxycholic acid from the cholic acid with which it is associated in natural bile. The cholic acid is then subjected to oxidation. Such oxidation procedures as practiced commercially usually result in the production of a mixture of keto derivatives of cholic acid, with the 7-keto derivative predominating. Various oxidizing agents can be used for this purpose with more or less success, such as chromic acid or oxide in dilute acetic acid, potassium dichromate in dilute mineral acid, potassium permanganate in an aqueous solution of acetic acid, a mixture of bromine and a bicarbonate, etc. One of the newer oxidizing agents which displays the desired type of selectivity is N-bromosuccinimide. However, as indicated previously, the usual end result of the oxidation is the production of a mixture of keto derivatives of cholic acid with the 7-keto derivative probably predominating. The mixture of reaction products will also usually contain some unreacted cholic acid, which it would be desirable to recover for further oxidation, as well as other useful and valuable derivatives which it would be desirable to recover, such as dehydrocholic acid (3,7,12-triketocholanic acid).

The present commercial practice for the completing of the conversion of the cholic to desoxycholic acid defeats the desire to recover the other constituents of the mixture obtained by the oxidation step. In this practice the mixture is subjected to a reduction procedure to reduce the 7-keto group of the desired derivatives to a methylene group. Usually, a Wolff-Kishner-type reduction is employed, followed by the isolation of the resulting desoxycholic acid. This reduction procedure destroys the value of the other components of the intermediate reaction mixture due to degradation and decomposition. This is particularly unfortunate, as indicated, in regard to the cholic acid which remained unreacted at the end of the oxidation step and to the dehydrocholic acid which was produced by the oxidation step. Further, because of the other constituents which are carried through the entire process until the final separation of the desoxycholic acid, there tends to be a reduction in the yield and quality of the desoxycholic acid obtained.

It has been suggested that some of the above described difficulties might be avoided by extracting the keto derivatives into ethyl acetate, concentrating the extracted material to a dry solid, redissolving the solid material in ethyl acetate, and adding diethylene glycol to precipitate the 7-keto derivative. The precipitated diethylene glycol adduct of the 7-keto derivative presumably would be separated from the supernatant containing the other keto derivatives, and then subjected to a Wolff-Kishner type reduction to produce desoxycholic acid.

The alternative process just described, however, is not well adapted for commercial operations. The use of ethyl acetate is objectionable because it is an unstable solvent, tending to hydrolyze when water is presented, especially when a water-containing solution of ethyl acetate is heated as is desirable in certain steps of the above described process. Further, the solubility of water in ethyl acetate is quite high, resulting in the ethyl acetate phase picking up large amounts of water during the extraction of the keto derivatives into the ethyl acetate from the aqueous reaction mixture.

It is, therefore, a general object of this invention to provide an improved method for separating the 7-keto derivative of cholic acid immediately after the oxidation step so that it can be further processed alone, while at the same time permitting the other valuable constituents of the intermediate reaction mixture to be recovered, such as the unreacted cholic acid, the other keto derivatives, and the dehydrocholic acid. Further objects and advantages will appear as the specification proceeds.

This invention is based in part upon the discovery that 3,12-dihydroxy-7-ketocholanic acid forms an addition compound with ethylene glycol, which by suitable procedures can be converted into either desoxycholic acid or into an isomer of desoxycholic acid. It has not as yet been determined whether this addition compound is in the nature of a derivative, a complex, or a coordination compound, but it is known that the molecular ratio of the 7-keto acid to the ethylene glycol in the addition compound is 2:1. Further, the same addition compound has been prepared from substantially pure 3,12-dihydroxy-7-ketocholanic acid as from the crude intermediate reaction mixture resulting when cholic acid is selectively oxidized as already described. It has also been discovered that ethylene glycol displays a selective action in only forming an addition compound with the 7-keto derivative of cholic acid and that no significant combination occurs with the other keto derivatives of cholic acid, such as the various possible mono-, di- and tri-keto derivatives.

Further, it has been found that ethylene glycol will selectively precipitate the 7-keto derivative of cholic acid form a water solution of this derivative which also contains substantial amounts of other keto derivatives of cholic acid. Therefore, it is possible to separate the 7-keto derivative directly from the aqueous reaction mixture resulting from the oxidation step. In this method of practicing the invention, it is preferred to add a large excess of the ethylene glycol to the aqueous solution of the keto derivatives to assure that substantially all of the 7-keto derivative is precipitated. While temperature and pH conditions have not been found to be particularly critical, it is preferred to carry out the precipitation at temperatures ranging from about 30° C. to 70° C. and at pH's ranging from about 6.9 to 5.5.

Another method of practicing this invention, which produces excellent results, is to extract the keto derivatives into methyl isobutyl ketone. The keto derivatives are quite soluble in methyl isobutyl ketone, while water is of very limited solubility therein. This has the advantage of allowing the keto derivatives to be extracted from the aqueous solution in which they are produced without obtaining them in an organic solvent phase which contains large amounts of water. This is particularly important because it has been found that the presence of water in the organic solvent solution of the keto derivatives tends to interfere with the subsequent precipitation of the 7-keto derivative by increasing the solubility of the ethylene glycol adduct of this derivative.

After the extraction of the keto derivatives, the methyl isobutyl ketone phase is separated from the water phase and the water phase is discarded. The ketone phase is then dried or dehydrated to substantially free it of water while retaining the keto derivatives in solution. This can be done by a short vacuum distillation or other suitable dehydrating procedures. The ethylene glycol is then added to the substantially water-free ketone solution of the keto derivatives to selectively precipitate the 7-keto derivative. The amount of ethylene glycol employed is not critical, except that it is not especially desirable to add an excess of ethylene glycol in this method of practicing the invention. The approximate amount of ethylene glycol to be added can be gaged by adding the ethylene glycol slowly or incrementally while agitating the mixture until no further precipitate forms on the addition of more ethylene glycol. The temperature conditions mentioned above are also suitable in precipitating the 7-keto derivative from dehydrated methyl isobutyl ketone.

The crystalline precipitate, comprising the addition compound of ethylene glycol and 3,12-dihydroxy-7-ketocholanic acid, which is obtained by either of the methods just described can readily be separated from the supernatant or mother liquor by centrifugation, filtration, etc. The separated 7-keto derivative can then be further processed to prepare desoxycholic acid or an isomer of this acid. For example, this can be done by the procedure described in Patent 2,471,697. However, when the reduction procedure as described in this patent is followed exactly, it has been found that the product obtained is usually an isomer of desoxycholic acid. Alternatively, the procedure described in my co-pending application, Serial No. 382,215, filed September 24, 1953, for "Method of Reducing Steroid Ketones" can be used.

Apparently the 7-keto derivative of cholic acid is subject to enolization, and is bound in its enol form in the addition compound which it forms with ethylene glycol. If this enol form is directly reduced without permitting a reverse enolization to occur, the resulting product is an isomer of desoxycholic acid. Therefore, it is usually desirable to carry out the reduction under conditions which permit the enol form to revert to the ketone form. This can be accomplished in a number of ways. One suitable procedure is to dissolve the addition compound in aqueous acetic acid as a preliminary step to the reduction. Also, it has been found that the incorporation of barium oxide in the reaction mixture promotes the desired reverse enolization. In other words, the procedure described in Patent 2,471,697 or in my copending application cited above can be followed except for the incorporation of a small amount of barium oxide in the reaction mixture. Desoxycholic acid will then be obtained. On the other hand, it may be desired to obtain the isomer of desoxycholic acid, in which case the special procedures for promoting reverse enolization can be omitted.

The mother liquor remaining after the separation of the 7-keto derivative will usually contain substantial quantities of other keto derivatives. These keto derivatives can then be subjected to a further oxidation to convert them to dehydrocholic acid, as described in my co-pending application United States Serial No. 383,920, filed October 2, 1953, for "Method of Preparing Oxidized Derivatives of Cholic Acid," now abandoned.

This invention is further illustrated by the following specific examples:

Example I

One liter of aqueous alkaline solution containing 130 g. of partially oxidized cholic acid, as with sodium salt, was mixed with 300 cc. of ethylene glycol and the solution warmed to 60° C. Aqueous sulfuric acid was added slowly with agitation until the pH of the mixture reached a value of 6.1, during which acidification the crystalline precipitate forms. Agitation is continued and the pH readjusted to 6.1 until such time as no more material precipitated at that pH.

The precipitate was filtered off, washed with aqueous ethylene glycol and dried, yielding 70 g. of the glycol addition compound of 3,12-dihydroxy-7-ketocholanic acid which had been reduced to yield desoxycholic acid.

The aqueous glycol mother liquor was further acidified to pH 4.0, precipitating the remainder of the bile acids as a semisolid precipitate. This material was dissolved in tertiary butyl alcohol and oxidized with aqueous sodium bichromate in the presence of sulfuric acid to dehydrocholic acid which is worked up as described in my Patent No. 2,651,642, column 3, yielding 40 grams of dehydrocholic acid.

Example II

Two liters of the same aqueous alkaline solution of partially oxidized cholic acid as described in Example I was acidified to pH 4.0 with sulfuric acid in the presence of one liter of methyl ethyl butyl ketone, the lower aqueous phase removed and discarded, and the supernatant solvent phase dried by azeotropic distillation and diluted to 1200 cc. with additional dry methyl isobutyl ketone. To this solution at 80° C. was added 50 cc. of ethylene glycol and the mixture cooled for crystallization. The crystalline glycol addition compound was separated by centrifugation and washed with methyl isobutyl ketone and dried, yielding 200 g. of the 7-keto 3,12-dihydroxycholanic acid glycolate, which is then reduced by the usual means to desoxycholic acid.

The methyl isobutyl ketone mother liquor and washings were treated with an equal volume of dilute aqueous alkali to extract the remaining bile acids, the aqueous extract acidified with sulfuric acid, and oxidized with sodium bichromate in the presence of tertiary butyl alcohol according to the method described in my Patent No. 2,651,642, yielding 35 g. of dehydrocholic acid.

While, in the foregoing specification, this invention has been described in relation to particular embodiments thereof and specific details have been set forth for the purpose of illustration, it will be apparent to those skilled in the art that it is susceptible to other embodiments and that many of the specific details set forth can be varied widely without departing from the spirit of the invention.

I claim:

1. In a process for preparing desoxycholic acid wherein an aqueous solution containing a mixture of 3,12-dihydroxy-7-ketocholanic acid with other keto derivatives of cholic acid is obtained, the method of selectively precipitating the 3,12-dihydroxy-7-ketocholanic acid from said aqueous solution comprising introducing ethylene glycol into said aqueous solution to form as a precipitate an addition compound of the ethylene glycol and the 3,12-dihydroxy-7-ketocholanic acid.

2. The method of precipitating 3,12-dihydroxy-7-ketocholanic acid from an aqueous solution thereof, characterized by adding ethylene glycol to said solution to form a precipitate.

3. The addition compound of ethylene glycol and 3,12-dihydroxy-7-ketocholanic acid characterized by being formed in the ratio of about two molecules of said acid to each molecule of said glycol.

4. In a process for preparing desoxycholic acid wherein an aqueous solution containing a mixture of 3,12-dihydroxy-7-ketocholanic acid with other keto derivatives of cholic acid is obtained, the method of separating 3,12-dihydroxy-7-ketocholanic acid with other keto derivatives of cholic acid is obtained, the method of separating 3,12-dihydroxy-7-ketocholanic acid characterized by the steps of extracting all of said keto derivatives from said aqueous solution thereof into methyl isobutyl ketone, adding ethylene glycol to the ketone extract, precipitating an addition compound of the ethylene glycol and the 3,12-dihydroxy-7-ketocholanic acid, and separating the addition compound from the mother liquor containing the other keto derivatives.

5. In a process for preparing desoxycholic acid wherein an aqueous solution containing a mixture of 3,12-dihydroxy-7-ketocholanic acid with other keto derivatives of cholic acid is obtained, the method of separating 3,12-dihydroxy-7-ketocholanic acid with other keto derivatives of cholic acid is obtained, the method of separating 3,12-dihydroxy-7-ketocholanic acid characterized by the steps of adding methyl isobutyl ketone to said aqueous solution to form a ketone phase and a water phase, extracting 3,12-dihydroxy-7-ketocholanic acid into the ketone-phase together with the other keto derivatives, separating the ketone phase from the water phase, removing substantially all of the water from the separated ketone phase while maintaining the keto derivatives in solution therein, and adding ethylene glycol to the substantially water-free ketone phase to form as a precipitate an addition compound of ethylene glycol and 3,12-dihydroxy-7-ketocholanic acid.

References Cited in the file of this patent

UNITED STATES PATENTS

| | | |
|---|---|---|
| 2,244,328 | Charonnat | June 3, 1941 |
| 2,549,947 | Tullar | Apr. 24, 1951 |
| 2,576,728 | Servis | Nov. 27, 1951 |